F. M. ILER.
MOLDING MACHINE.
APPLICATION FILED SEPT. 11, 1919.
1,419,566.
Patented June 13, 1922.
4 SHEETS—SHEET 4.
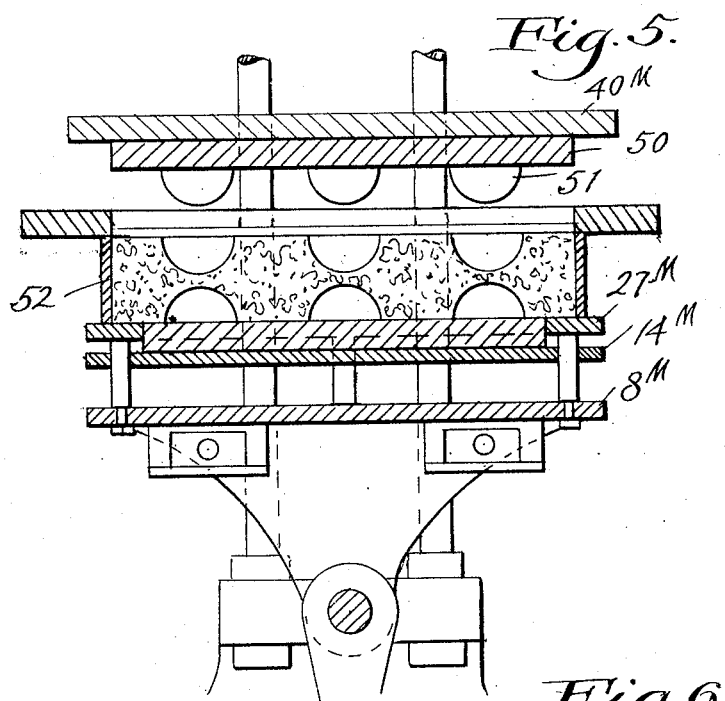
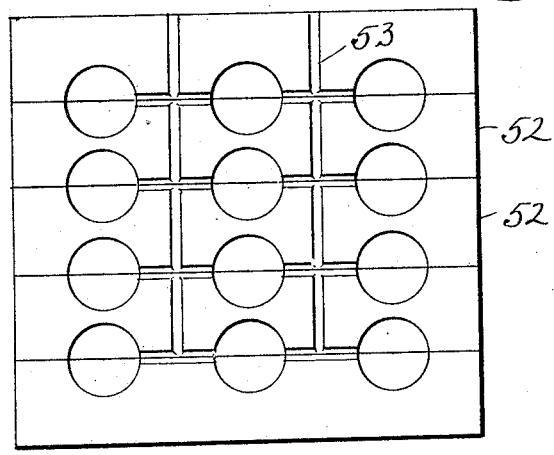

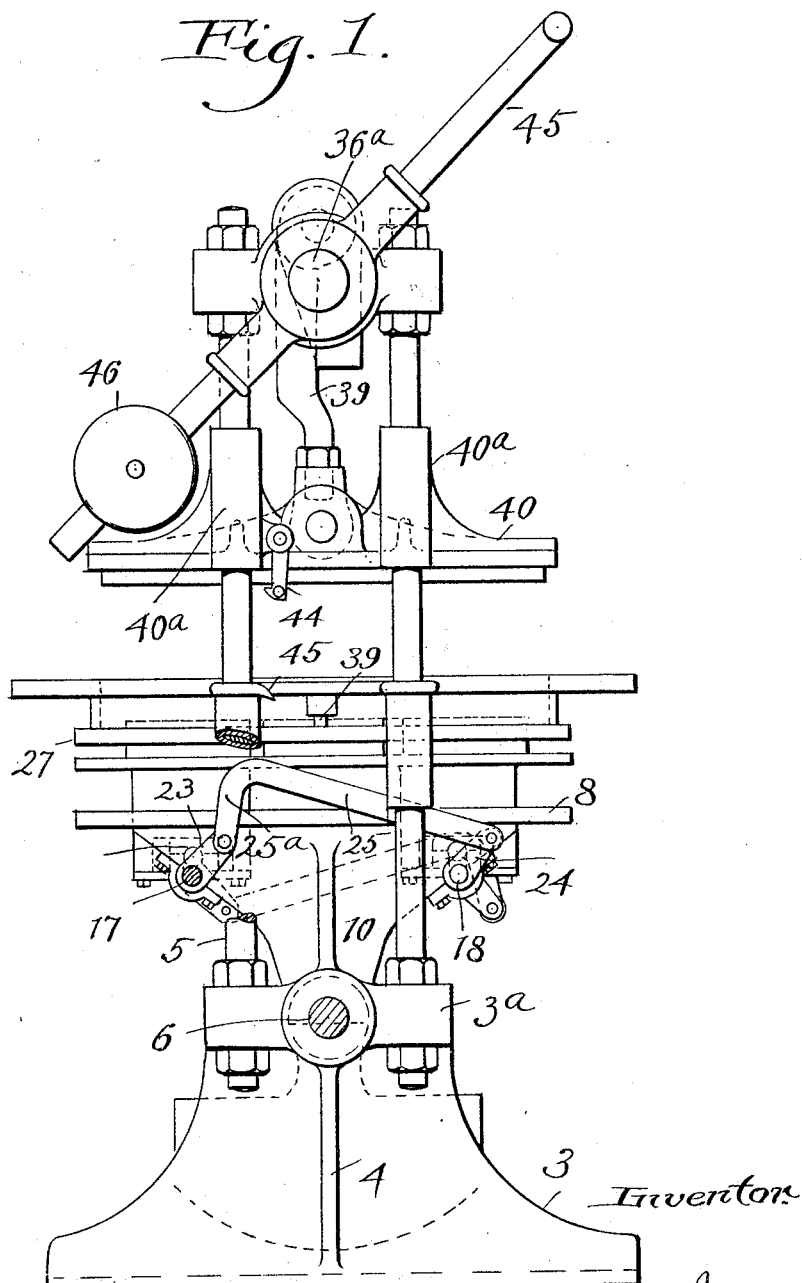

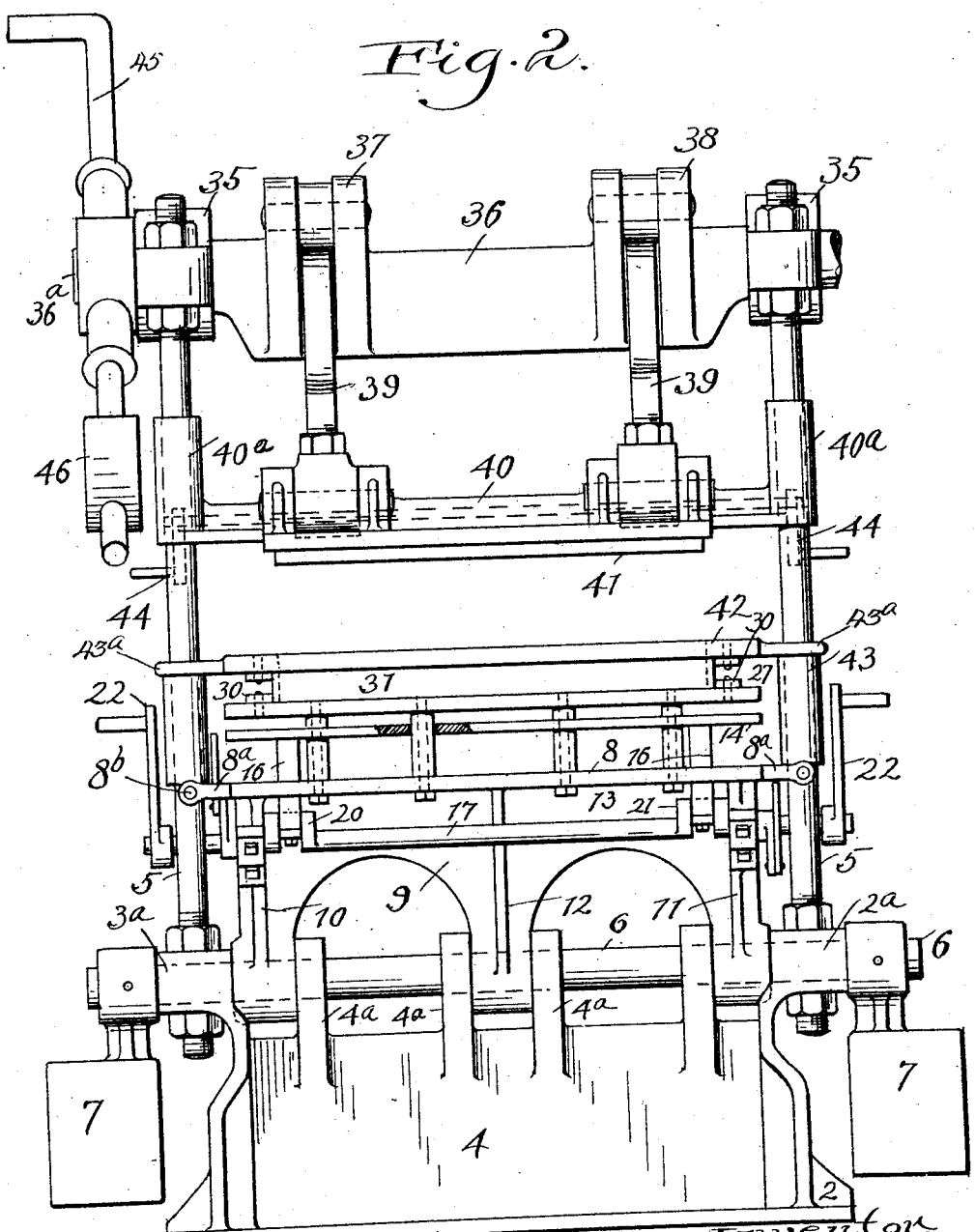

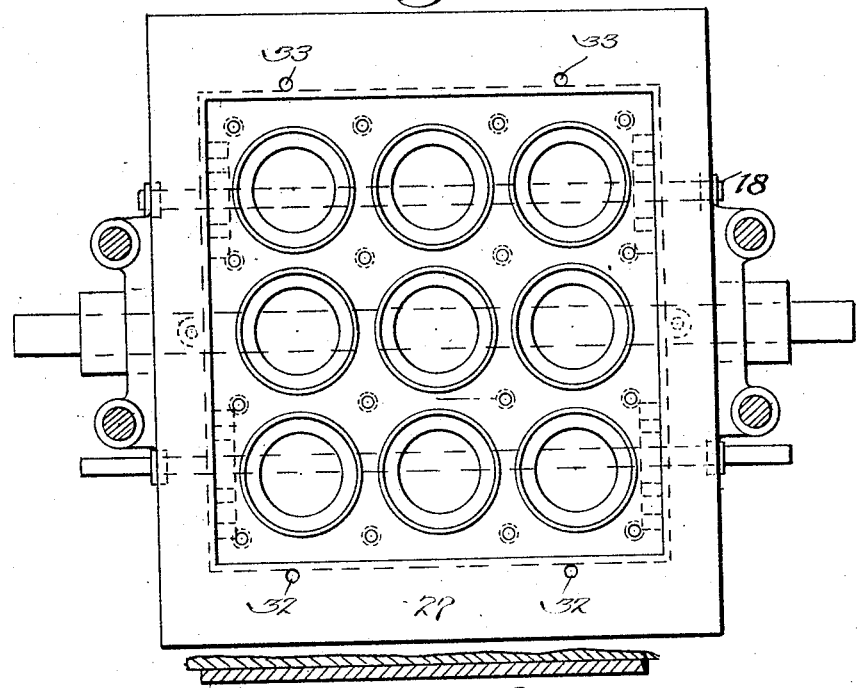
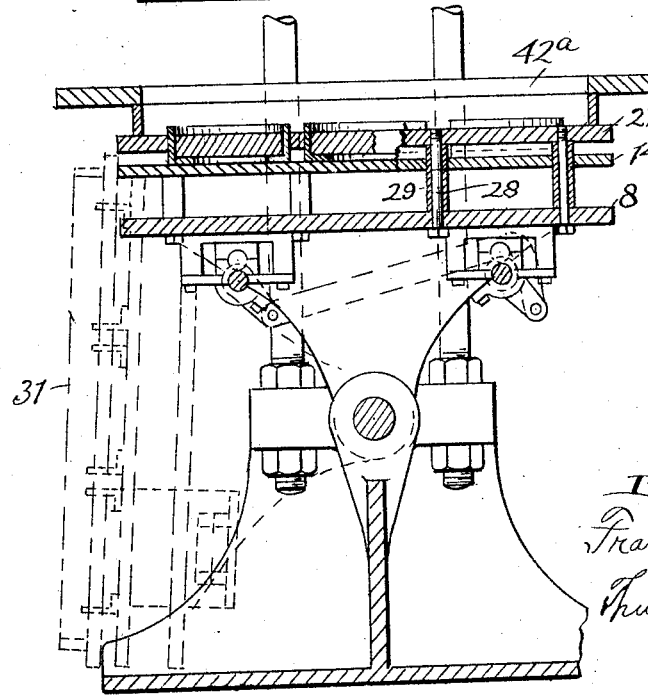

UNITED STATES PATENT OFFICE.

FRANKLIN M. ILER, OF CLEVELAND, OHIO.

MOLDING MACHINE.

1,419,566.     Specification of Letters Patent.    Patented June 13, 1922.

Application filed September 11, 1919. Serial No. 323,099.

*To all whom it may concern:*

Be it known that I, FRANKLIN M. ILER, a citizen of the United States, residing at Cleveland, in the county of Cuyahoga and State of Ohio, have invented a certain new and useful Improvement in Molding Machines, of which the following is a full, clear, and exact description.

This invention relates to a molding machine.

One of the important objects of the invention is to provide a molding machine in which the molding table which carries the flask is movably mounted so that when the molding operation is complete the molding table may be moved to a position such that the flask is positioned on its edge and may be removed from the table on its edge instead of in a horizontal position as is the usual method.

The foregoing is a matter of considerable importance particularly in the making of molds for the casting of small objects wherein the sand of mold is comparatively small in thickness. Such molds if removed in a horizontal position from the molding machine break and the sand drops out, but where as in the present machine, the flask is delivered from the machine on the edge of the flask, the flask itself forms a protection so far as dislocating the sand in the flask is concerned.

A further object of the invention is to provide an improved mechanism for raising and lowering a pattern plate used in connection with the molding machine.

Further objects of the invention will appear more at large as the description proceeds and generally speaking the invention may be said to comprise the elements and the combinations thereof set forth in the accompanying claims.

Reference should be had to the accompanying drawings forming a part of this specification in which Fig. 1 is a side elevation of a molding machine embodying the present invention; Fig. 2 is a rear elevation; Fig. 3 is a sectional elevation of the lower part of the molding machine; Fig. 4 is a top plan view of the molding table with associated parts; Fig. 5 is a sectional elevation showing a portion of the machine of slightly modified construction; Fig. 6 is an elevation of a stack of molds made by the machine shown in Fig. 5.

In the present machine the sand is compressed in the flask by means of a reciprocating presser head and the molding table with its flask is pivotally mounted so that after the mold is formed, the molding table with the mold thereon may be moved so that the mold assumes a substantially vertical position, resting on the edge of the flask. It will be apparent that the construction which embodies a movable molding table may be used in connection with other types of mechanisms for compacting the sand within the flask than that of a presser head mechanism, but for purposes of disclosure the present molding machine is shown as having a presser head and operating mechanism therefor.

Referring to the drawings, 1 indicates a base which has end members 2 and 3, which members are joined by an intermediate web 4. The end members 2 and 3 at their upper portions are provided with oppositely extending heads as indicated at $3^a$ and $2^a$ to which heads are secured vertically extending rod members 5, there being four such rod members, two mounted at each side of the machine.

At their opposite ends these rod members 5 support the presser head and the mechanism for operating the same which will later be described. A shaft 6 extends transversely of the machine and is mounted adjacent its opposite end in bearings which are formed in the heads $2^a$ and $3^a$ of the base. The shaft extends slightly beyond its bearings and upon the extending ends there are mounted counterweights 7.

The molding table proper is indicated at 8 and is supported by a support which may be generally indicated at 9. This support comprises end members 10 and 11 and an intermediate member 12. These members are provided with openings which are mounted upon the shaft 6 and these members are positioned by means of extensions $4^a$ which are formed as part of the base. The end members 10 and 11 support the table at the ends thereof and the member 12 supports the table at the center thereof. There is a transversely extending web 13 which joins the members 10, 11 and 12.

This molding table and its associated parts may be cast as an integral structure.

The table 8 carries stop members $8^a$ which extend from opposite sides of the table and are positioned so as to engage with the upright rods 5 at the opposite sides of the machine when the molding table is in its normal or horizontal position. These stop members 8ª are provided with set screws 8ᵇ which directly engage the rods 5 and may be adjusted so as to give the molding table 8 the exact position which it should have in order to properly cooperate with the presser head.

Above the molding table 8 is a pattern plate 14. This pattern plate has suitable patterns secured thereto, such as indicated at 15 in Fig. 3. The pattern plate adjacent the four corners thereof is provided with posts 16. These posts extend through openings in the molding table 8. The two posts at one end of the machine cooperate with a transversely extending shaft 17 while the similar posts at the opposite end of the machine cooperate with another transversely extending shaft 18.

These shafts 17 and 18 are at their opposite ends mounted in the portions 10 and 11 beneath the molding table. Inasmuch as the shafts 17 and 18 are the same, description of one will suffice for the description of the other. The shaft 17 is provided with crank arms 20 and 21 adjacent its opposite ends and with these crank arms the posts 16 cooperate. The shaft 17 extends beyond the post 5, and at its opposite ends is prepared to receive a handle 22 by which it may be turned.

The shaft 18 is not operable by means of a crank as is the shaft 17 although it may be made so, but preferably mechanism is provided whereby the turning movement of the shaft 17 is transmitted to the shaft 18 so that they are simultaneously operated and when so operated raise and lower the pattern plate 14.

One form of mechanism which may be employed to connect the shafts 17 and 18 is shown in the drawings.

The shaft 17 at one end thereof is provided with an arm 23 and the shaft 18 at the same end is provided with an arm 24. These arms 23 and 24 are joined by a lever 25 which is at one end provided with a substantially right angled portion 25ª. When the shaft 17 is turned motion is transmitted through the lever 25 so that the shaft 18 is turned and due to the particular shape of the member 25, the portion 25ª moves over and down below the axis of the shaft 17, thus giving substantially 180° of movement to the shaft 17 which movement provides the maximum required in the operation of the pattern plate.

The opposite end of the shaft 17 to that which has been described, as well as the opposite end of the shaft 18 are provided with arms similar to the arms 23 and 24. These arms, however, are positioned 90° with respect to the arms 23 and 24. These arms which are at the opposite ends of the shafts 17 and 18 joined with a lever similar to the lever 25 but the position of the lever is reversed so that the right angled end of the lever connects with the arm secured to the shaft 18.

It will be seen that when the lever 25 is in the position shown in Fig. 1, the similar lever at the opposite end of the machine is in the position where the right angled portion extends over the shaft 18. This construction not only permits the desired angular movement of the shafts 17 and 18, but also forms a limiting construction with respect to the movement of the shafts 17 and 18, for, when the right angled portion of the lever 25 or its complementary lever at the opposite end of the machine occupies its final position with the right angled portion beneath the shaft, the member 25 will engage the shaft 17 and prevent further turning movement. The same is true with respect to the similar construction at the opposite end of the machine.

Above the pattern plate 14 is a stripping plate 27. This stripping plate is supported directly upon the molding table 8. This is accomplished by means of bolts 28 which extend through sleeves 29, the sleeves positioning the stripping plate with respect to the table 8 while the bolts 29 secure the same. The stripping plate is of course provided with suitable openings through which the patterns may extend.

Furthermore, the pattern plate 14 is provided with openings which accommodate the sleeves 29 and by this construction the pattern plate is guided in its raising and lowering movement.

The stripping plate 27 is provided with positioning members 30 which are adapted to engage with a flask 31.

At the forward end or front end the stripping plate is provided with suitable supports or pegs, such as indicated at 32 and at the rear end the stripping plate has other pegs or dowel pins 33 which holds the flask in contact with the members 32.

The molding table, the pattern plate, the stripping plate and the flask carried by the stripping plate are all of such dimension that they lie between the side rod members 5 and all these parts may be moved as a unit upon the shaft 6. This movement may be continued until the parts are in the position shown at the left side of Fig. 3 wherein the molding table and the flask 31 are in substantially vertical position so that the flask is resting on its edge against the retaining members 32 and the flask may be removed in this vertical position.

The counterweights 7 are as their name indicates for counterweighting the molding table and the parts associated therewith.

Each pair of rod members 5 at the opposite ends of the machine are provided with head members 35 which join the adjacent rod members 5. These head members support the opposite ends of a member 36 which extends between them. This member 36 being rotatably supported. The member 36 is provided with two pairs of ears or flanges such as indicated at 37 and 38. Between these flanges 37 and 38 there is pivotally mounted two arms 39.

These arms 39 are secured to a presser head 40. This presser head extending transversely of the machine and its opposite ends is provided with sleeves 40$^a$ which surround and slide upon the rods 5, these rods thereby serving to guide the presser head 40 in its movement.

As will be seen the arms 39 are slightly offset with respect to their pivotal point and their point of attachment to the presser head 40.

Upon the underside the presser head is provided with a presser plate 41 which is of suitable size to compress the sand within the flask carried by the stripping plate.

Below the presser plate 41 there is a frame 42 which has an opening therein indicated at 42$^a$ in Fig. 3. This opening is of the same size as the opening in the flask. The member 42 at its opposite ends is connected with sleeves 43 which surround and slide upon the rods 5, thereby serving to guide the member 42 in its vertical movement.

At opposite ends the presser head 40 is provided with swinging latches 44 and the sleeve 43 which is below the latch is provided with a projection 43$^a$ which is adapted to cooperate with a latch 44 so as to lift the frame 42 when the presser head is elevated.

The member 36 is turned for the purpose of raising and lowering the presser plate by means of an arm 45 which is secured to the member 36, or more correctly speaking, the portion 36$^a$ which extends beyond the bearing of the member 36 in the head 35.

A counterweight 46 is mounted upon the extension 36$^a$ and in line with the operating member 45.

In operating the machine thus described the various parts are assembled with respect to each other as shown in Figs. 1 and 2, that is to say the pattern plate is in its highest position so that the patterns extend through the openings provided therefor in the stripping plate 27. The flask 31 is positioned upon the stripping plate 27 and the frame 42 rests upon the top of the flask.

Sand is then introduced into the flask 31 and leveled off to be even with the top of plate 42. The squeezer head 40 is then lowered until the plate 41 comes within the opening within the frame 42 and is pressed down so that as a result the sand is compressed to lie substantially level with the top of the flask 31.

As the presser head 40 descends to its lowest position the catches 44 engage beneath the extensions 45 carried by the sleeves 43 so that as the head 40 is elevated, the frame 42 is carried upwardly with the head.

The shaft 17 is then turned by means of one of the cranks 42 thereby lowering the pattern plate and the patterns carried thereby from the stripping plate 27.

The molding table 8 is then swung about the shaft 6 to the position shown in dotted lines in Fig. 3 so that the flask with its contained sand is resting on the edge of the flask and in substantially vertical position. The flask and sand may then be removed maintaining the vertical position of the flask so that the molded sand is not damaged by the movement because the sand is supported by the flask.

This is particularly advantageous where the mold which has been formed is a thin mold, that is to say, where the thickness of the sand is not very great.

The mold which has thus been described is of course but one part of the mold, either the core or the drag and it will be understood that the other part of the complete mold may be similarly molded on a machine of the character which is herein disclosed or otherwise.

In Fig. 5 I have shown a construction which so far as the machine is concerned is quite like that which has been described heretofore, this illustration shows the molding table 8$^m$, the pattern plate 14$^m$ and the stripping plate 27$^m$ in exactly the same relationship as that previously described, however, the presser head 40$^m$ is provided with a plate 50 to which are affixed patterns such as shown at 51. This plate 50 has a double function. It acts as a presser plate and at the same time acts as a pattern plate.

When therefore a flask 52 is placed upon the stripping plate 27$^m$, filled with sand and the presser head 40$^m$ caused to descend, the resultant action is to form a mold having cavities corresponding to the patterns 51 and the patterns carried by the plate 14$^m$ in opposite faces of the mold.

Such molds may be assembled as shown in Fig. 6 wherein one face of a mold produced as above described forms a core while the other portion forms a drag.

In order to complete such a stack of molds, the bottom member is molded as a drag only and the top mold is molded as a core only. This series of molds may be gated as indicated at 53 in Fig. 6 employing as many sprues as may be necessary to secure a proper flow of metal to the various parts of the build up mold.

Such an arrangement of molds as suggested in Fig. 6 is an exceedingly economical procedure saving considerable cost in the making of the mold, particularly where the articles to be cast are small, and the individual molds are of small depth.

Various changes may be made in the details of construction without departing from the invention and I do not limit myself to the precise construction disclosed except as the claims may specifically do so.

Having described my invention, I claim

1. In a molding machine a base member, a frame, a molding table, means for mounting said molding table on the base so that the molding table may tilt, said molding table being mounted so that it may move into a substantially vertical plane at the side of the frame, means associated with the molding table for engaging and retaining a flask when the table is moved as aforesaid, said frame having a portion which engages with the said molding table thereby preventing the molding table from being tilted substantially beyond said vertical position.

2. In a molding machine a base member and frame having permanent side members, a reciprocating presser head mounted at the upper end of said side members, a molding table, means for pivotally mounting said molding table upon the base whereby the molding table may move into a substantially vertical plane outside of the said frame, means associated with the molding table for engaging and retaining a flask when the table is moved as aforesaid, the said base being provided with portions which will engage with the molding table should the same move beyond a substantially vertical position.

3. In a molding machine a base member, a frame having stationary upright side members, a pattern plate carried by said upright members and extending between the same, a molding table, means for pivotally mounting said molding table upon the base whereby the table may move to a substantially vertical plane outside of the said frame and means associated with the molding table for engaging and retaining a flask when the table is moved as aforesaid and means for preventing movement of said table beyond and substantially vertical plane.

4. In a molding machine, a base member, a molding table pivotally mounted upon the base member, means associated with the said table for supporting and retaining the flask when the table is moved about its pivot, and a pattern plate having patterns thereon which is movable with respect to the said table.

5. In a molding machine a molding table, a stripping plate supported above the said table, a pattern plate lying between the table and the stripping plate, arms upon which the said pattern plate is mounted, two transversely extending shafts associated with the molding table, said shafts being connected with the arms of the pattern plate whereby the pattern plate is raised and lowered as the shafts are turned, each of said shafts at adjacent ends being provided with arms secured thereto and an L-shaped lever which at its opposite ends is connected with the arms at the ends of the said shaft.

6. In a molding machine, a molding table, a stripping plate supported above the said table, a pattern plate between the stripping plate and the molding table, arms connected with the pattern plate, a pair of transversely extending shafts, the said arms being connected with the shafts in a manner to raise and lower the pattern plate as the shafts are turned, the said shafts at one end thereof having arms secured thereto, an L-shaped lever connecting said arms, the opposite ends of said shafts also having arms which are displaced 90° with respect to the first mentioned arms and an L-shaped lever joining said arms, the said L-shaped levers being reversely disposed with respect to each other.

7. In a molding machine, a base member, a molding table pivotally mounted upon the base member whereby the molding table may be moved into a substantially vertical position, a pattern plate having patterns thereon associated with the molding table, means associated with the molding table for retaining a flask and supporting the same when the table is moved about its pivot.

8. In a molding machine, a base member, a molding table pivotally mounted upon the base member and capable of being moved to a position substantially at right angles with respect to the base member, a stripping plate mounted upon the molding table, a pattern plate having patterns thereon which are adapted to extend through suitable openings in the stripping plate, means for raising and lowering the pattern plate, means carried by the stripping plate for retaining and supporting a flask when the table is moved about its pivot.

9. In a molding machine, a base member, a molding table pivotally mounted upon the base member, a stripping plate mounted upon the said table and provided with openings, a pattern plate having patterns thereon which cooperate with the openings in the stripping plate, means for raising and lowering the pattern plate, means for supporting a flask when the said table is moved about its pivot and a presser head normally located about the said table and movable toward and from said table.

10. In a molding machine, a base member, a molding table pivotally mounted upon the said base member, means associated with the said table for positioning and holding a flask when the said table is moved about its pivot, a head member mounted above the said table and having a pattern thereon, said head member being movable toward and from the said molding table.

11. In a molding machine, a base member, a molding table pivotally mounted upon the said base member, means associated with said table for positioning and holding a flask when the said table is moved about its pivot, a presser head member, a pattern carried by said presser head, means for moving said presser head toward and from the molding table.

12. In a molding machine, a base member, a molding table pivotally mounted upon the base member, a stripping plate having openings mounted upon the said table, a pattern plate mounted between the stripping plate and the said table, patterns carried by the said plate which cooperate with the openings in the stripping plate, means for raising and lowering the pattern plate, means for retaining and supporting a flask when the molding table is moved about its pivot, a presser head located above the molding table, a pattern plate carried by said presser head, and means for moving said presser head toward and from the molding table.

In testimony whereof, I hereunto affix my signature.

FRANKLIN M. ILER.